United States Patent
Kilpatrick et al.

(10) Patent No.: US 7,672,645 B2
(45) Date of Patent: Mar. 2, 2010

(54) PROGRAMMABLE TRANSMITTER ARCHITECTURE FOR NON-CONSTANT AND CONSTANT ENVELOPE MODULATION

(75) Inventors: John Kilpatrick, Lexington, MA (US);
Joel Dawson, Cambridge, MA (US);
Jose Bohorquez, Cambridge, MA (US);
Jeff Venuti, Somerville, MA (US)

(73) Assignee: BitWave Semiconductor, Inc., Lowell, MA (US)

( * ) Notice: Subject to any disclaimer, the term of this patent is extended or adjusted under 35 U.S.C. 154(b) by 741 days.

(21) Appl. No.: 11/454,134

(22) Filed: Jun. 15, 2006

(65) Prior Publication Data

US 2007/0293163 A1 Dec. 20, 2007

(51) Int. Cl.
*H04B 1/40* (2006.01)
*H04Q 7/20* (2006.01)

(52) U.S. Cl. .................. 455/76; 455/102; 455/103; 455/127.4

(58) Field of Classification Search ............... 455/76, 455/102–103, 127.4, 552.1, 553.1; 331/2, 331/10, 11
See application file for complete search history.

(56) References Cited

U.S. PATENT DOCUMENTS

| | | | |
|---|---|---|---|
| 3,538,450 | A | 11/1970 | Andrea et al. |
| 4,031,330 | A | 6/1977 | Van Leeywen et al. |
| 4,525,865 | A | 6/1985 | Mears |
| 4,843,588 | A | 6/1989 | Flynn |
| 4,984,295 | A | 1/1991 | Engstrom |
| 4,988,957 | A | 1/1991 | Thomas et al. |
| 5,031,233 | A | 7/1991 | Ragan |
| 5,152,005 | A | 9/1992 | Bickley |
| 5,175,729 | A | 12/1992 | Borras et al. |
| 5,187,450 | A | 2/1993 | Wagner |
| 5,291,516 | A | 3/1994 | Dixon et al. |

(Continued)

FOREIGN PATENT DOCUMENTS

EP  0664617 A  7/1995

(Continued)

OTHER PUBLICATIONS

G.K. Dehng, et al.; A Single-Chip RF Transceiver for Quad-Band GSM/GPRS Applications; IEEE Radio Frequency Integrated Circuits Symposium Aug. 4, 2004.

(Continued)

*Primary Examiner*—Lee Nguyen
(74) *Attorney, Agent, or Firm*—Lando & Anastasi, LLP

(57) ABSTRACT

Transmitter architectures designed to accommodate both constant and non-constant of envelope modulation schemes and capable of providing local oscillator carrier frequencies within any one of numerous desired frequency bands, thus allowing compliance with many different communication standards. One example of a programmable frequency synthesizer includes a plurality of transmitter components and a microcontroller coupled to the frequency synthesizer and to the plurality of transmitter components. The microcontroller is adapted to provide a frequency control signal to the frequency synthesizer to control a frequency of the local oscillator carrier frequency. In addition, the microcontroller is also adapted to provide digital control signals to at least some of the plurality of transmitter components to turn on and off different ones of the plurality of transmitter components based on an operating mode of the transmitter, such that the transmitter can accommodate both constant envelope modulation and non-constant envelope modulation schemes.

19 Claims, 7 Drawing Sheets

U.S. PATENT DOCUMENTS

| | | |
|---|---|---|
| 5,307,029 A | 4/1994 | Schenk |
| 5,307,071 A | 4/1994 | Arnold et al. |
| 5,378,334 A | 1/1995 | Dadoo et al. |
| 5,461,344 A | 10/1995 | Andoh |
| 5,528,222 A | 6/1996 | Moskowitz et al. |
| 5,563,895 A | 10/1996 | Malkamaki et al. |
| 5,574,405 A | 11/1996 | Razavi |
| 5,655,003 A | 8/1997 | Erving et al. |
| 5,666,355 A | 9/1997 | Huah et al. |
| 5,712,628 A | 1/1998 | Phillips et al. |
| 5,739,730 A | 4/1998 | Rotzoll |
| 5,794,159 A | 8/1998 | Portin |
| 5,835,850 A | 11/1998 | Kumar |
| 5,838,205 A * | 11/1998 | Ferraiolo et al. ............... 331/2 |
| 5,859,878 A | 1/1999 | Phillips et al. |
| 5,867,535 A | 2/1999 | Phillips et al. |
| 5,909,193 A | 6/1999 | Phillips et al. |
| 5,953,640 A | 9/1999 | Meador et al. |
| 5,969,929 A | 10/1999 | Kleveland et al. |
| 5,973,575 A | 10/1999 | Kamogawa et al. |
| 6,014,551 A | 1/2000 | Pesola et al. |
| 6,072,994 A | 6/2000 | Phillips et al. |
| 6,084,285 A | 7/2000 | Shahani et al. |
| 6,091,765 A | 7/2000 | Pietzold, III et al. |
| 6,094,097 A | 7/2000 | Ke |
| 6,107,893 A | 8/2000 | Forbes |
| 6,114,920 A | 9/2000 | Moon et al. |
| 6,125,268 A | 9/2000 | Boesch et al. |
| 6,147,567 A | 11/2000 | Welland et al. |
| 6,157,206 A | 12/2000 | Taylor et al. |
| 6,157,230 A | 12/2000 | O'Toole et al. |
| 6,169,733 B1 | 1/2001 | Lee |
| 6,181,734 B1 | 1/2001 | Palermo |
| 6,185,418 B1 | 2/2001 | MacLellan et al. |
| 6,198,332 B1 | 3/2001 | O'Toole et al. |
| 6,201,454 B1 | 3/2001 | Kinayman et al. |
| 6,205,133 B1 | 3/2001 | Bexten |
| 6,211,747 B1 | 4/2001 | Trichet et al. |
| 6,269,277 B1 | 7/2001 | Hershenson et al. |
| 6,278,698 B1 | 8/2001 | O'Toole et al. |
| 6,282,184 B1 | 8/2001 | Lehman et al. |
| 6,285,865 B1 | 9/2001 | Vorenkamp et al. |
| 6,335,952 B1 | 1/2002 | Lee et al. |
| 6,343,207 B1 | 1/2002 | Hessel et al. |
| 6,349,217 B1 | 2/2002 | Honcharenko et al. |
| 6,353,640 B1 | 3/2002 | Hessel et al. |
| 6,356,603 B1 | 3/2002 | Martin et al. |
| 6,366,622 B1 | 4/2002 | Brown et al. |
| 6,377,315 B1 | 4/2002 | Carr et al. |
| 6,377,788 B1 | 4/2002 | Elder et al. |
| 6,381,265 B1 | 4/2002 | Hessel et al. |
| 6,388,597 B1 | 5/2002 | Maezawa et al. |
| 6,389,078 B1 | 5/2002 | Hessel et al. |
| 6,389,092 B1 | 5/2002 | Momtaz |
| 6,404,293 B1 | 6/2002 | Darabi et al. |
| 6,405,025 B1 | 6/2002 | Keski-Mattinen |
| 6,417,737 B1 | 7/2002 | Moloudi et al. |
| 6,417,740 B1 | 7/2002 | Anh et al. |
| 6,426,680 B1 | 7/2002 | Duncan et al. |
| 6,462,594 B1 | 10/2002 | Robinson et al. |
| 6,477,148 B1 | 11/2002 | Gardenfors et al. |
| 6,483,355 B1 | 11/2002 | Lee et al. |
| 6,483,391 B1 | 11/2002 | Magoon et al. |
| 6,496,546 B1 | 12/2002 | Allpress et al. |
| 6,498,819 B1 | 12/2002 | Martin |
| 6,509,799 B1 | 1/2003 | Franca-Neto |
| 6,510,185 B2 | 1/2003 | Lee et al. |
| 6,510,313 B1 | 1/2003 | Rapeli |
| 6,512,419 B1 | 1/2003 | Adams et al. |
| 6,516,206 B2 | 2/2003 | Jantti |
| 6,525,558 B2 | 2/2003 | Kim et al. |
| 6,525,609 B1 | 2/2003 | Behzad |
| 6,526,264 B2 | 2/2003 | Sugar et al. |
| 6,539,052 B1 | 3/2003 | Hessel et al. |
| 6,545,516 B2 | 4/2003 | Ylamurto et al. |
| 6,549,078 B1 | 4/2003 | Sridharan et al. |
| 6,549,766 B2 | 4/2003 | Vorenkamp et al. |
| 6,573,864 B2 | 6/2003 | Sanada et al. |
| 6,580,328 B2 | 6/2003 | Tan et al. |
| 6,583,679 B1 | 6/2003 | Cox et al. |
| 6,584,146 B2 | 6/2003 | Bose et al. |
| 6,591,091 B1 | 7/2003 | Vorenkamp et al. |
| 6,608,527 B2 | 8/2003 | Moloudi et al. |
| 6,621,365 B1 | 9/2003 | Hallivuori et al. |
| 6,624,484 B2 | 9/2003 | Christensen et al. |
| 6,624,668 B1 | 9/2003 | Robinson et al. |
| 6,625,464 B1 | 9/2003 | Bandy et al. |
| 6,631,261 B1 | 10/2003 | Farber |
| 6,633,550 B1 | 10/2003 | Gardenfors et al. |
| 6,636,747 B2 | 10/2003 | Harada et al. |
| 6,650,653 B1 | 11/2003 | Horng et al. |
| 6,653,904 B2 | 11/2003 | Franco-Neto |
| 6,662,003 B2 | 12/2003 | Elder et al. |
| 6,665,339 B1 | 12/2003 | Adams et al. |
| 6,681,102 B1 | 1/2004 | Collier et al. |
| 6,686,804 B1 | 2/2004 | Adams et al. |
| 6,690,949 B1 | 2/2004 | Shamlov et al. |
| 6,694,128 B1 | 2/2004 | Sorrells et al. |
| 6,700,447 B1 | 3/2004 | Nilsson |
| 6,704,549 B1 | 3/2004 | Sorrells et al. |
| 6,710,424 B2 | 3/2004 | Schmidt |
| 6,714,776 B1 | 3/2004 | Birleson |
| 6,738,601 B1 | 5/2004 | Rofougaran et al. |
| 6,741,639 B1 | 5/2004 | Yoshida et al. |
| 6,747,524 B2 | 6/2004 | Takahashi et al. |
| 6,747,531 B2 | 6/2004 | Vathulya |
| 6,747,987 B1 | 6/2004 | Meador et al. |
| 6,748,014 B1 | 6/2004 | Kuo et al. |
| 6,748,204 B1 | 6/2004 | Razavi et al. |
| 6,748,206 B1 | 6/2004 | Matsumoto |
| 6,757,334 B1 | 6/2004 | Feher |
| 6,759,904 B2 | 7/2004 | Behzad |
| 6,765,540 B2 | 7/2004 | Toncich |
| 6,774,685 B2 | 8/2004 | O'Toole et al. |
| 6,774,736 B1 | 8/2004 | Kwek et al. |
| 6,774,738 B2 | 8/2004 | Hammes et al. |
| 6,778,023 B2 | 8/2004 | Christensen |
| 6,781,424 B2 | 8/2004 | Lee et al. |
| 6,801,092 B1 | 10/2004 | Moloudi |
| 6,801,097 B2 | 10/2004 | Wallace |
| 6,801,777 B2 | 10/2004 | Rusch |
| 6,804,309 B1 | 10/2004 | Morelos-Zaragoza |
| 6,806,785 B2 | 10/2004 | Traub |
| 6,819,197 B2 | 11/2004 | Maldonado |
| 6,823,292 B2 | 11/2004 | Spencer |
| 6,836,192 B1 | 12/2004 | Yang et al. |
| 6,882,233 B2 | 4/2005 | Oh et al. |
| 6,915,117 B2 | 7/2005 | Chominski et al. |
| 6,960,962 B2 | 11/2005 | Peterzell et al. |
| 7,020,444 B2 | 3/2006 | Shinbo et al. |
| 7,031,668 B2 | 4/2006 | Darabi et al. |
| 7,053,726 B2 | 5/2006 | Hino |
| 7,103,337 B2 | 9/2006 | Uozumi et al. |
| 7,148,759 B2 | 12/2006 | Marton |
| 2001/0007151 A1 | 7/2001 | Vorenkamp et al. |
| 2001/0008430 A1 | 7/2001 | Carr et al. |
| 2001/0011013 A1 | 8/2001 | Vorenkamp et al. |
| 2001/0038323 A1 | 11/2001 | Christensen |
| 2002/0063576 A1 | 5/2002 | Kim et al. |
| 2002/0079972 A1 | 6/2002 | Su et al. |
| 2002/0093385 A1 | 7/2002 | Nishiyama et al. |
| 2002/0101907 A1 | 8/2002 | Dent et al. |
| 2002/0111152 A1 | 8/2002 | Razavi et al. |
| 2002/0135044 A1 | 9/2002 | Tille et al. |

| | | | |
|---|---|---|---|
| 2002/0140869 A1 | 10/2002 | Carr et al. | |
| 2002/0141511 A1 | 10/2002 | Vishakhadatta et al. | |
| 2002/0151287 A1 | 10/2002 | Lindquist et al. | |
| 2002/0163396 A1 | 11/2002 | Lim et al. | |
| 2002/0163407 A1 | 11/2002 | Vathulya | |
| 2002/0187763 A1 | 12/2002 | Lim et al. | |
| 2002/0193084 A1 | 12/2002 | Lim et al. | |
| 2002/0193140 A1 | 12/2002 | Behrens et al. | |
| 2003/0003887 A1 | 1/2003 | Lim et al. | |
| 2003/0021367 A1 | 1/2003 | Smith | |
| 2003/0025563 A1 | 2/2003 | Christensen | |
| 2003/0025579 A1 | 2/2003 | Christensen | |
| 2003/0030495 A1 | 2/2003 | Franca-Neto | |
| 2003/0043950 A1 | 3/2003 | Hansen et al. | |
| 2003/0057429 A1 | 3/2003 | Schmidt | |
| 2003/0072320 A1 | 4/2003 | Seo et al. | |
| 2003/0099210 A1 | 5/2003 | O'Toole et al. | |
| 2003/0116810 A1 | 6/2003 | Kim | |
| 2003/0137358 A1 | 7/2003 | Lee et al. | |
| 2003/0162521 A1 | 8/2003 | Vorenkamp et al. | |
| 2003/0194978 A1 | 10/2003 | Vorenkamp et al. | |
| 2003/0227332 A1 | 12/2003 | Lee et al. | |
| 2004/0014428 A1 | 1/2004 | Franca-Neto | |
| 2004/0021181 A1 | 2/2004 | Christensen | |
| 2004/0042539 A1 | 3/2004 | Vishakhadatta et al. | |
| 2004/0051095 A1 | 3/2004 | Oosawa et al. | |
| 2004/0053595 A1 | 3/2004 | Shinbo et al. | |
| 2004/0092242 A1 | 5/2004 | Endo | |
| 2004/0155687 A1 | 8/2004 | Lee et al. | |
| 2004/0232999 A1 | 11/2004 | Kim | |
| 2005/0041755 A1 | 2/2005 | Hammes | |
| 2005/0046488 A1 | 3/2005 | Grewing et al. | |
| 2005/0070325 A1 | 3/2005 | Bellaouar | |
| 2005/0088249 A1 | 4/2005 | Oehm et al. | |
| 2005/0124377 A1* | 6/2005 | Shih et al. | 455/552.1 |
| 2005/0190002 A1 | 9/2005 | Takinami et al. | |
| 2005/0212604 A1 | 9/2005 | Cyr et al. | |
| 2005/0220217 A1 | 10/2005 | Yamawaki et al. | |
| 2005/0245292 A1 | 11/2005 | Bennett et al. | |
| 2006/0030277 A1 | 2/2006 | Cyr et al. | |

FOREIGN PATENT DOCUMENTS

| | | |
|---|---|---|
| EP | 0762662 A2 | 3/1997 |
| EP | 0841754 A3 | 12/1998 |
| EP | 1071249 B1 | 1/2001 |
| EP | 1091398 A1 | 4/2001 |
| EP | 1154569 A2 | 11/2001 |
| EP | 1251577 A2 | 10/2002 |
| EP | 1282227 A2 | 2/2003 |
| EP | 1032982 B1 | 4/2003 |
| EP | 1320189 A | 6/2003 |
| EP | 1331742 A2 | 7/2003 |
| EP | 1356651 B1 | 10/2003 |
| EP | 1381163 A1 | 1/2004 |
| EP | 1391989 A1 | 2/2004 |
| EP | 1032981 B1 | 8/2004 |
| EP | 1460762 A | 9/2004 |
| GB | 2105543 A | 3/1983 |
| GB | 2354649 A | 3/2001 |
| GB | 2361123 A | 10/2001 |
| JP | 06224738 A2 | 8/1994 |
| JP | 2000-223656 A2 | 8/2000 |
| WO | WO 90/14709 A1 | 11/1990 |
| WO | WO 94/21061 A1 | 9/1994 |
| WO | WO 95/29566 A1 | 11/1995 |
| WO | WO 97/08839 A2 | 3/1997 |
| WO | WO 97/08840 A2 | 3/1997 |
| WO | WO 98/37639 A1 | 8/1998 |
| WO | WO 98/47190 A1 | 10/1998 |
| WO | WO 99/23762 A | 5/1999 |
| WO | WO 99/25075 A2 | 5/1999 |
| WO | WO 99/63656 A | 12/1999 |
| WO | WO 01/61856 A1 | 8/2001 |
| WO | WO 02/31988 A2 | 4/2002 |
| WO | WO 02/084782 A2 | 10/2002 |
| WO | WO 02/084783 A1 | 10/2002 |
| WO | WO 02/084788 A1 | 10/2002 |
| WO | WO 02/084868 A1 | 10/2002 |
| WO | WO 02/084869 A1 | 10/2002 |
| WO | WO 02/089311 A3 | 11/2002 |
| WO | WO 03/060543 A3 | 7/2003 |
| WO | WO 03/061108 A | 7/2003 |
| WO | WO 03/061174 A2 | 7/2003 |
| WO | 03073659 A2 | 9/2003 |
| WO | 03073659 A3 | 9/2003 |
| WO | WO 03/073661 A2 | 9/2003 |
| WO | WO 03/079699 A1 | 9/2003 |
| WO | 03083659 A1 | 10/2003 |
| WO | WO 2004/010576 A1 | 1/2004 |
| WO | WO 2004/062087 A1 | 7/2004 |
| WO | 2004107590 A1 | 12/2004 |
| WO | 2005078916 | 8/2005 |
| WO | WO 2005078916 A | 8/2005 |

OTHER PUBLICATIONS

E. Götz, et al.; A Quad-Band Low Power Single Chip Direct Conversion CMOS Transceiver with ΣV—Modulation Loop for GSM; British Library Publication Apr. 3, 2003.

S. Hung-Lung Tu; A Power-Adaptive CMOS Class E RF Tuned Power Amplifier for Wireless Communications; 0-7803-8182; IEEE Mar. 2003.

J. Loraine; Counting The Cost of RF System-On-Chip; British Library publication.

Sven Mattison, Architecture and Technology for Multistandard Transceivers; 0-7803-8108; IEEE Aug. 1, 2001.

W. Michielson, et al.;Analysis and Design of a Double Tuned Clapp Oscillator for Multi-Band Multi-Standard Radio; British Library, Mar. 3, 2003.

T. Schwanenberger, et al.; A Multi Standard Single-Chip Transceiver Covering 5.15 to 5.85GHz; ISCC 200, Session 20 Sep. 3, 2003.

A. Thanachayanout, et al.; CMOS RF Amplifier with Tuneable Band-Selection and Image Rejection; 0-7803-7765; IEEE Jun. 3, 2003.

A. Thanachayanont, et al.; Inductorless RF Amplifier with Tuneable Band-Selection and Image Rejection; 0-7803-7761; IEEE Mar. 3, 2003.

M. Torimau, et al.;Sharp Applies variable gate width to design a sub-nanosecond bulk CMOS gate array; British Library Mar. 1985.

K. Vavelidis, et al.; A Single-Chip, 5.15GHz-5.35GHz, 2.4GHz-2.5GHz, 0.18 μm CMOS RF Transceiver for 802.11 a/b/g Wireless LAN; 0-7803-8108; IEEE Apr. 3, 2003.

Ahmed, A. et al., "CMOS VCO-prescaler cell-based design for RF PLL frequency synthesizers," 2000 *IEEE Proceedings ISCAS*, Geneva, vol. 2, May 2000, pp. 737-740.

Hwang, M.W., et al., A fully-integrated low power direct conversion transmitter with fractional-N PLL using a fast AFC technique for CDMA applications, Radio Frequency integrated Circuits (RFIC) Symposium, 2005. Digest of Papers 2005 IEEE Jun. 12-14, 2005, pp. 679-682.

ISSCC 2004, Feb. 16, 2004, Salon 9, Digest of Technical Papers, p. 97, 515-517.

Vaucher, C.S. et al., "A Family of Low-Power Truly Modular Programmable Dividers in Standard 0.35-um CMOS Technology," IEEE J. Solid-State Circuits, vol. 35, pp. 1039-1045, Jul. 2000.

* cited by examiner

PROGRAMMABLE TRANSMITTER ARCHITECTURE FOR NON-CONSTANT AND CONSTANT ENVELOPE MODULATION

BACKGROUND

1. Field of Invention

The present invention is directed to a programmable transmitter, in particular, a transmitter architecture designed to accommodate multiple types of envelope modulation.

2. Discussion of Related Art

Modern modulation techniques that are part of the transceiver architecture of a wireless communication system can generally be classified as belonging to either non-constant (variable) or constant envelope modulation schemes. One example of a widely used non-constant envelope modulation scheme is the EDGE (Enhanced Data Rate for GSM Evolution) standard that was introduced with the intent to improve the data speed of GSM (Groupe Special Mobile) networks from 270.833 kilobits per second (kbps) to 812.5 kbps. EDGE utilizes a $3\pi/8$ eight-Phase Shift Key (PSK) modulation. Some other examples of non-constant envelope modulation schemes include Code Division Multiple Access 2000 (CDMA2k), Universal Mobil Telecommunications Systems (UMTS), integrated Digital Enhanced Networks (iDEN), High Speed Downlink Packet Access (HSDPA), and Wireless Fidelity (WiFi) networks as defined by the various 802.11 standards. As an alternative, some communication standards use so-called constant envelope modulation, which generally relies on such schemes as FSK (Frequency Shift Keying), GFSK (Gaussian Frequency Shift Keying), MSK (Minimum Shift Keying), and GMSK (Gaussian Minimum Shift Keying). Although constant envelope modulation is not as bandwidth efficient as is non-constant envelope modulation, it is in world-wide use as part of the GSM wireless communication standard which uses GMSK modulation. Another popular communication standard that also uses constant envelope modulation is the Digital European Cordless Telecommunications (DECT) standard.

A constant envelope modulator in a wireless communication system may generally use a voltage controlled oscillator (VCO) embedded in a phase locked loop (PLL) circuit to achieve the frequency and/or phase modulation of signals. The PLL may typically include a phase frequency detector (PFD), a charge pump, a loop filter, a VCO, and a programmable fractional-N frequency divider. The digital divider is used to select the channel and frequency band of operation. The frequency produced by the PLL must remain precisely controlled, with an accuracy ranging from 0.1 parts per million (ppm) for GSM to 25 ppm for DECT applications. A so-called sigma-delta (SD) modulator may be used to control the fractional-N frequency divider so as to achieve finer tuning accuracy, to generate spurious-free local oscillator (LO) frequencies and to permit faster frequency jumps as the channels are switched. An example of such a frequency synthesizer including a sigma-delta modulator is described in U.S. Pat. No. 6,700,447 to Nilsson entitled "TRIMMING OF A TWO POINT PHASE MODULATOR," which is herein incorporated by reference.

When using a PLL, the modulation bandwidth is limited by the PLL filter bandwidth. Making the loop filter bandwidth larger to accommodate wider modulation bandwidths has a detrimental impact on the output noise, thus several approaches have been suggested to overcome this limitation. For example, one can pre-distort the high frequency portion of the signal to offset the attenuation of the loop filter. Alternatively, a so-called two-point modulation (TPM) approach can be implemented in which the same signal is applied both to the VCO tuning port as well as to the digital divider circuit.

One example of a phase-locked loop (PLL) frequency synthesizer employing a two-point modulation scheme using a sigma-delta modulator and fractional-N divider circuit is described in U.S. Patent Application 2003/043950 to Hansen et al. entitled "PHASE-LOCKED LOOP FREQUENCY SYNTHESIZER WITH TWO-POINT MODULATION," which is herein incorporated by reference. The '950 application discloses that, in the synthesizer, data are modulated at both the PLL frequency divider and the voltage-controlled oscillator (VCO), and that the complementary frequency responses at these two modulation points allow the PLL bandwidth to be sufficiently narrow to attenuate phase noise from the phase detector, frequency divider, and SIGMADELTA quantization error, without adversely affecting the data. Another example of a two-point modulator including a PLL that can be operated at various reference frequencies is described in U.S. Patent Application 2005/041755 to Hammes entitled "TWO-POINT MODULATOR ARRANGEMENT AND USE THEREOF IN A TRANSMISSION ARRANGEMENT AND IN A RECEPTION ARRANGEMENT," which is herein incorporated by reference. U.S. Pat. No. 6,774,738 to Hammes et al. entitled "TRIMMING METHOD FOR A TRANSCEIVER USING TWO-POINT MODULATION," also incorporated herein by reference, describes another example of a transceiver having a PLL circuit that operates on a two-point modulation scheme, wherein the amplitude of an analog modulation signal is selected on the basis of a modulation shift of a defined digital modulation signal. The '738 patent discloses that a predetermined data sequence of the analog modulation signal is applied, the modulation shift of the analog modulation signal is determined, and the amplitude of the analog modulation signal is corrected to match the difference between the modulation shift of the digital modulation signal and the determined modulation shift of the analog modulation signal.

As mentioned above, many communication standards call for non-constant, rather than constant, envelope modulation. In many implementations, a non-constant envelope modulation scheme may use the frequency synthesizer of the transceiver to generate a local oscillator signal that can be applied to a quadrature mixer and RF (radio frequency) amplifier. For non-constant envelope modulation a direct quadrature modulator circuit can be employed. However, these circuits can suffer from several drawbacks. For example, in the well-known simple direct modulation transmitter, translation of the analog signal to a radio frequency signal is done in one or multiple stages, and special care must be exercised in order to ensure isolation between the power amplifier and the VCO (i.e., by minimizing coupling between the stages), otherwise cross-talk and VCO "pulling" may cause signal distortion.

An example of a dual-stage transmitter is described in U.S. Pat. No. 6,915,117 to Chominski et al. entitled "MULTI-STAGE MODULATION ARCHITECTURE AND METHOD IN A RADIO," which is herein incorporated by reference. The '117 patent discloses a transmitter in which the analog signal is modulated and mixed to produce a radio frequency output, and a separate mixing frequency signal is provided to each stage. A single frequency synthesizer is used and first and second divider circuits each receive the output of the frequency synthesizer and deliver a mixing signal to the first and second stages respectively.

SUMMARY OF INVENTION

Aspects and embodiments of the present invention are directed to transmitter architectures designed to accommodate both constant and non-constant of envelope modulation schemes. Various embodiments of the frequency synthesizer and transmitter architectures described herein may be capable of providing local oscillator carrier frequencies within any one of numerous desired frequency bands, and may thus allow compliance with many different communication standards. In particular, according to one embodiment, there may be provided a flexible frequency synthesizer design that may incorporate multiple voltage controlled oscillators (VCOs) and allow switching between different VCOs and course tuning of resonant circuits within each VCO selection to accomplish switching between different operating frequency bands, as well as fine tuning within each selected frequency band. Digital control, in particular, digital switching on and off, of components and reuse of component blocks within the transmitter for different operating modes and frequencies may provide a compact and power-efficient transmitter that may be easily fabricated and yet offers great versatility.

According to one embodiment a programmable transmitter may comprise a programmable frequency synthesizer adapted to generate a local oscillator carrier frequency, a plurality of transmitter components, and a microcontroller coupled to the frequency synthesizer and to the plurality of transmitter components. The microcontroller may be adapted to provide a frequency control signal to the frequency synthesizer to control a frequency of the local oscillator carrier frequency. The microcontroller may be further adapted to provide digital control signals to at least some of the plurality of transmitter components to turn on and off different ones of the plurality of transmitter components based on an operating mode of the transmitter, such that the transmitter can accommodate both constant envelope modulation and non-constant envelope modulation schemes. In one embodiment, the programmable transmitter may further comprise a digital baseband interface adapted to receive digital data to be transmitted. In one example, the plurality of transmitter components may include a digital-to-analog converter coupled to the digital baseband interface and adapted to receive the digital data and to convert the digital data into I and Q analog data signals, and a quadrature mixer coupled to the digital-to-analog converter and adapted to receive the I and Q analog data signals from the analog baseband block, and also coupled to the frequency synthesizer and configured to receive the local oscillator carrier frequency from the frequency synthesizer, the quadrature mixer being configured to combine the local oscillator carrier frequency and the I and Q analog data signals to provide a radio frequency data signal from transmission. The programmable transmitter may be configured to implement, for example, direct IQ modulation for the non-constant envelope modulation scheme. In another example, the programmable transmitter may further comprise a pulse-shaping filter coupled between the frequency synthesizer and the digital baseband interface. The microcontroller may be configured to provide the digital control signals to the pulse-shaping filter to turn off the pulse-shaping filter. In another example, the frequency synthesizer may further comprise a phase-locked loop including a fractional-N divider and a voltage controlled oscillator, wherein the frequency synthesizer is configured to receive the digital data from the digital baseband interface via the pulse-shaping filter. The frequency synthesizer may be configured to implement, for example, phase-locked loop modulation for the constant-envelope modulation scheme. In this example, the microcontroller may be configured to provide the digital control signals to turn off the digital-to-analog converter and the quadrature mixer.

According to another example, the programmable transmitter may further comprise a voltage controlled oscillator monitoring loop adapted to monitor a voltage response of the voltage controlled oscillator, the voltage controlled oscillator monitoring loop includes a variable gain amplifier, an analog-to-digital converter, and a digital controller. A first input port of the voltage controlled oscillator may be coupled to the analog-to-digital converter which receives a voltage signal from the phase-locked loop and provides an output digital monitoring signal. A second digital-to-analog converter may be coupled between an input of the variable gain amplifier and an output of the pulse-shaping filter, the second digital-to-analog converted being adapted to receive the digital data from the pulse-shaping filter and to provide an analog input signal to the variable gain amplifier. In addition, the digital controller may be configured to receive the output digital monitoring signal from the analog-to-digital converter and to provide a gain control signal to the variable gain amplifier. Furthermore, an output signal of the variable gain amplifier may be provided to a second input port of the voltage controlled oscillator, and the digital controller may be configured to adjust the gain control signal so as to reduce variations in voltage between the output signal from the variable gain amplifier and the voltage signal from the phase-locked loop provided to the second input port of the voltage controlled oscillator. In one example, the frequency synthesizer may comprise a voltage controlled oscillator connected in a phase-locked feedback loop with a fractional-N programmable divider. The voltage controlled oscillator may comprise a resonant circuit including an inductive element connected in parallel with a switchable capacitor bank and at least one variable capacitance. In one example, the switchable capacitor bank may comprise a plurality of fixed-value capacitors coupled together via a plurality of switches; wherein the plurality of switches are activated by the microcontroller to switch in and out selected ones of the plurality of fixed-value capacitors so as to select an operating frequency band for the frequency synthesizer. In another example, the microcontroller may be further configured to control a capacitance value of the variable capacitor so as to fine tune a frequency of the local oscillator carrier frequency within the selected operating frequency band. In another example, the inductive element may include at least one bondwire.

Another embodiment is directed to a frequency synthesizer comprising a plurality of voltage controlled oscillators, a filter having an input coupled to a first terminal of a switch and an output coupled to a multiplexer, a first divider having an input coupled to the first terminal of the switch and an output coupled to the multiplexer, and a second divider having an input coupled to the first terminal of the switch and an output coupled to the multiplexer. The switch may be operable to select an output of one of the plurality of voltage controlled oscillators and to couple the selected voltage controlled oscillator output to the first terminal of the switch, and the multiplexer may be configured to provide a local oscillator carrier signal provided by the selected voltage controlled oscillator output. In one example, the frequency synthesizer may further comprise a programmable fractional-N divider coupled in a feedback loop between the first terminal of the switch and an input port of each of the plurality of voltage controlled oscillators.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
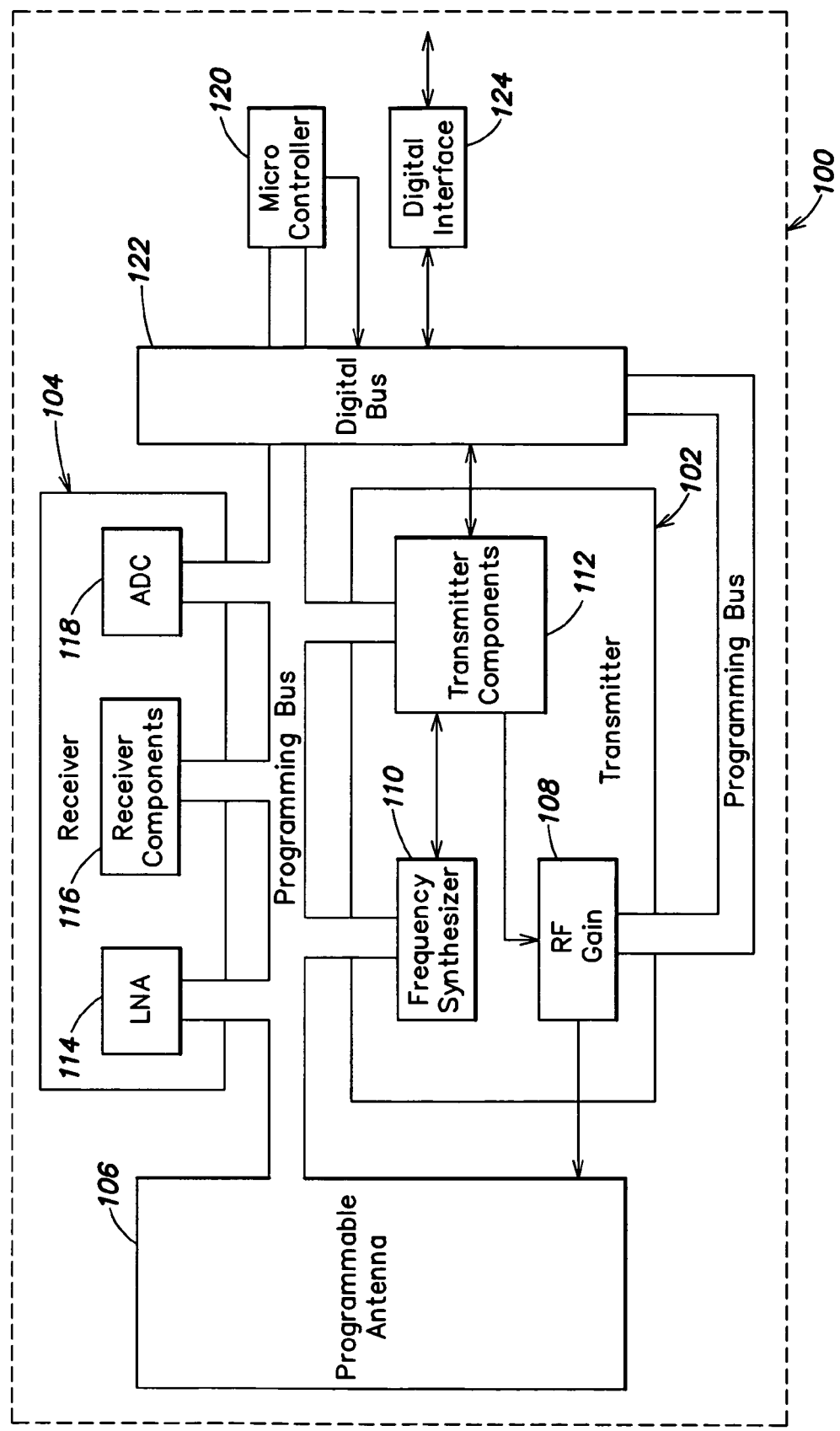
FIG. 1 is a block diagram of an example of a transceiver according to an embodiment of the invention.

Aspects and embodiments of the invention are directed to a programmable transceiver architecture that allows both constant and non-constant envelope modulation. The circuit implementation of constant and non-constant envelop modulation circuits traditionally requires two separate, distinctly different implementation approaches, including separate frequency synthesizers or phase locked loops (PLLs) for each modulation schemes. As a result, many prior art transceivers are capable of supporting only one type of envelope modulation (i.e., either constant or non-constant, but not both), or require multiple chipsets (e.g., multiple frequency synthesizers or phase-locked loop circuits) to accommodate different modulation schemes. For example, U.S. Pat. No. 6,747,987 (which is herein incorporated by reference) describes a multi-protocol, multi-band transmitter architecture that supports both constant and non-constant envelope modulation, but requires a second PLL to generate an offset frequency in front of the quadrature modulator. In addition, such prior art frequency synthesizer implementations may require a large component count, resulting in a large chip area. This is undesirable both because larger chip area results in greater manufacturing costs, and because the modern trend is toward smaller and smaller devices. Further, as discussed above, difficulties are encountered in attempts to extend the PLL filter bandwidth and thus, in prior art designs, the bandwidth of the modulation scheme is limited mostly to a single communication standard (e.g., GSM, EDGE, cdma2K, etc.)

Due to the rapid proliferation of hand-held wireless devices, there is an interest in a single, multi-mode capable transceiver system with a programmable single frequency synthesizer architecture that allows wide band, multi-mode operation via programmable switching between constant envelope (e.g., used in standards such as GSM and DECT) and non-constant (e.g., cdma2k, UMTS, EDGE, iDEN, HSDPA, WiFi) envelope modulations schemes. According to one embodiment of the invention, there is disclosed a programmable transmitter architecture that enables both direct IQ modulation for non-constant envelope schemes and PLL-based, two point modulation or pre-distortion for constant envelope schemes. In one example, the programmable architecture uses a single fractional-N synthesizer with digital controls that enable switching between, or turning on and/or off of, component blocks to accommodate either constant envelope or non-constant envelope modulation. In this manner, common component blocks may be used for either modulation scheme, and un-used blocks may be turned off, thereby conserving power.

It is to be appreciated that this invention is not limited in its application to the details of construction and the arrangement of components set forth in the following description or illustrated in the drawings. The invention is capable of other embodiments and of being practiced or of being carried out in various ways, and the invention is not limited to the examples presented unless specifically recited in the claims. In addition, it is to be appreciated that the phraseology and terminology used herein is for the purpose of description and should not be regarded as limiting. The use of the words "including," "comprising," "having," "containing," or "involving," and variations thereof herein, is meant to encompass the items listed thereafter and equivalents thereof as well as additional items.

Referring to FIG. 1, there is illustrated a block diagram of an example of a radio transceiver in which a transmitter according to various embodiments of the invention might be used. It is to be appreciated that the transceiver may include other components not shown in FIG. 1, and that the configuration illustrated in FIG. 1 is illustrative only and not intended to be limiting, nor to represent actual transceiver IC layout. In the illustrated example, a transceiver 100 includes a transmitter 102 and a receiver 104 each coupled to an antenna 106 for receiving and transmitting radio frequency (RF) signals. The transmitter may comprise an RF gain block 108, a frequency synthesizer 110 and other transmitter components 112, as discussed below. The receiver may comprise a low noise amplifier 114 to amplify incoming RF signals, various receiver components 116 for processing the incoming RF signals, and an analog-to-digital converter 118. The transmitter 102 and receiver 104 may both be connected to a microcontroller 120 via a digital programming bus 122. The microcontroller may provide control signals to various components of the transmitter and/or receiver, as discussed below. A digital baseband interface 124 may be provided for receiving digital data to be transmitted and for providing as an output digital data that has been decoded from incoming RF signals by the receiver.

According to one embodiment, a transceiver such as that shown in FIG. 1 may be a fully integrated radio transceiver with digital inputs and outputs that is programmable and configurable for multiple radio frequency bands and standards, and that is capable of connecting to many different network service providers or standards. Wireless communication continues to expand rapidly, and there are multiple frequency bands and communications standards/protocols for cellular, wide area, local area networks, public safety and military communications is use throughout the world. This abundance of different protocols and standard make ubiquitous communications difficult at best, and therefore there is an interest in a programmable transceiver that may be capable of operating across several of these different standards. In one example, therefore, embodiments of the transmitter described herein may be used in such a programmable transceiver. However, it is to be appreciated that embodiments of the transmitter described below are not required to be used in a radio transceiver. Although the following discussion may make reference to using the transmitter in a multi-standard radio transceiver to illustrate some of the functionality of the transmitter, this is only one example of an application for an embodiment of the transmitter. Various embodiments of the a transmitter according to the invention may be used in many different applications, including but not limited to, single standard radio transceivers, multi-standard radio transceivers, stand-alone transmitters, transmitters and/or transceivers that are used for other applications than wireless communications, and the like.

Figure 2:
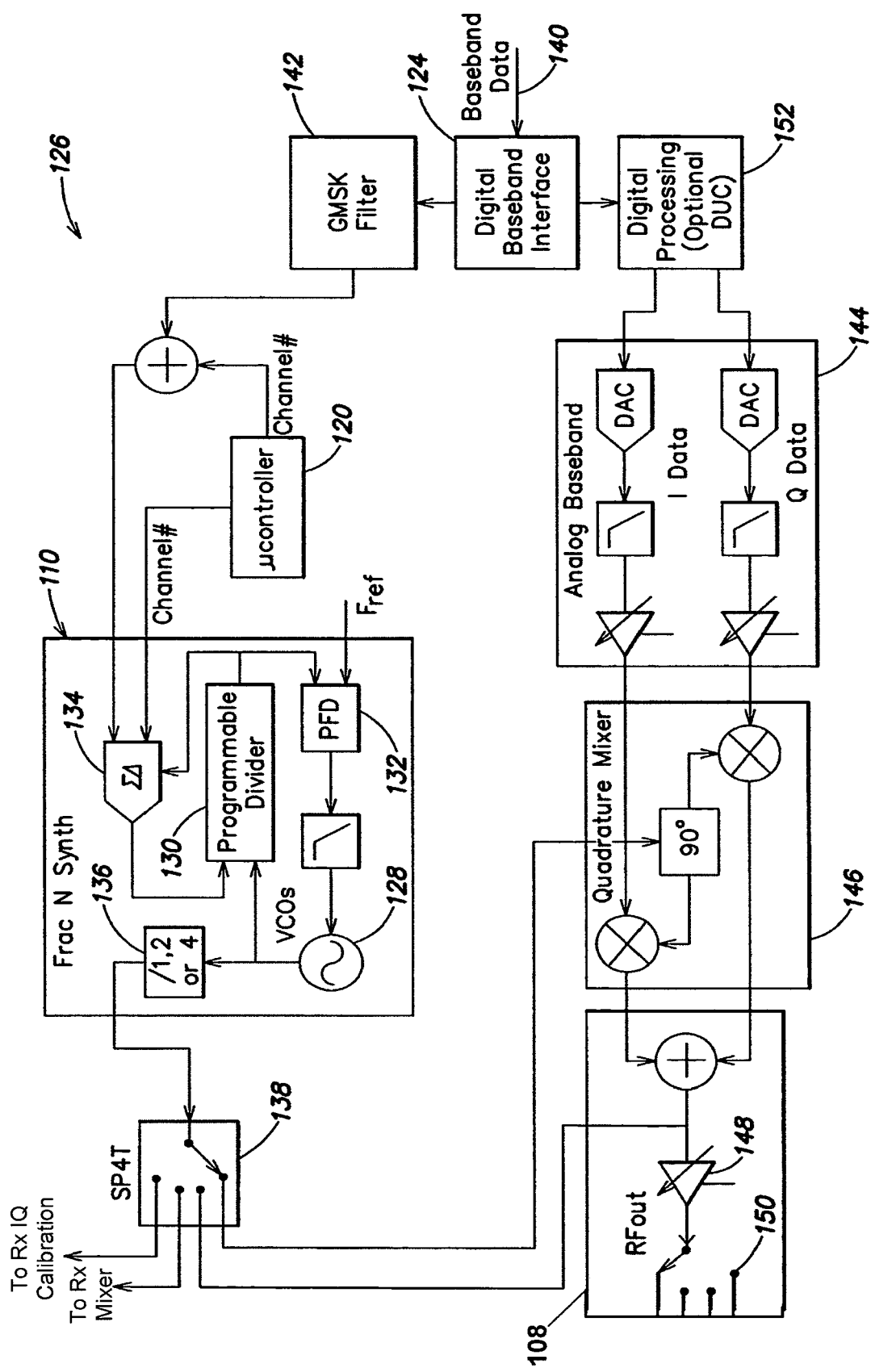
FIG. 2 is a block diagram of one example of a shared transmitter architecture that includes a fractional-N synthesizer, a quadrature mixer, an analog I/Q analog baseband, an RF gain block, digital signal processing blocks and a switching structure, in accordance with embodiments of the invention.

Referring to FIG. 2, there is illustrated a block diagram of one embodiment of a programmable shared constant envelope and non-constant envelope transmitter architecture that can be substituted for the transmitter 102 of FIG. 1, according to aspects of the invention. The circuit 126 comprises a Fractional-N frequency synthesizer 110 that may include one or more voltage controlled oscillators (VCOs) 128, a programmable divider 130, and a phase detector 132 connected in a feedback loop, as shown. In a wireless handset transmitter, a typical application for the frequency synthesizer (FS) is to provide a local oscillator signal (LO) to a mixer which in turn is being used to up-convert a modulated data signal to a higher, radio frequency (RF), signal that is suitable for transmission over an antenna. The frequency synthesizer 102 may further include a Sigma-Delta (ΣΔ) modulator 134, coupled to the programmable divider 130, and an output divider 136. The sigma-delta modulator may be used to modulate the VCO at the output of the frequency synthesizer with digital data that is to be transmitted, as known to those skilled in the art. Operation of the frequency synthesizer 110 is described further below.

In one embodiment, the transmitter architecture may also include a micro-controller 120 that may provide control signals to some of the transmitter components, such as, for example, the VCO 128, the programmable divider 130, and other components. When the transmitter is used in a programmable transceiver such as that described with reference to FIG. 1, the microcontroller 120 may be a shared microcontroller that provides control signals to transceiver components. However, it is to be appreciated that in other examples, whether the transmitter is used in a radio transceiver or not, the microcontroller 120 in the transmitter may be a dedicated transmitter microcontroller. The microcontroller may also provide digital control signals to turn off components that are not used when the transmitter is operating in a given mode, as discussed further below. A switch 138 may be used to switch the output signal from the frequency synthesizer between several different components, as described below. The transmitter may further include a Digital Baseband Interface 124 that may receive baseband data on line 140. The transmitter may also include a pulse shaping filter 142 which may be, for example, Gaussian Minimum Shift Keying (GMSK) filter, a Digital-to-Analog converter block 144, a Quadrature Mixer 146, and an RF gain block 108. The RF gain block may comprise a variable gain amplifier 148 to amplify the signal before transmission, and an output port/band select switch 150. In addition, in some embodiments, the transmitter may include a digital processing block 152 that may process the baseband data before it is applied to the quadrature mixer 146. As discussed below, some of these components may be shared between two or more operating modes of the transmitter and others may be specific to one or more operating modes of the transmitter.

The transmitter architecture shown in FIG. 2 may be operated in any one of three modes, namely, a Direct Conversion Mode for non-constant envelope modulation, a Phase-Lock Loop (PLL) Mode for constant envelope modulation, and a Two-Point Modulation (TPM) Mode for constant envelope modulation. For non-constant envelope (e.g., direct IQ) modulation, the frequency synthesizer may create the local oscillator signal for the quadrature mixer, as discussed below. For the constant envelope case, VCO modulation may be performed through a PLL-Mode configuration or a two-point modulation, and the unused quadrature mixer and baseband sections may digitally be turned off to conserve power. According to one embodiment, such a programmable architecture may employ only one PLL, unlike prior art designs which require multiple PLLs to accommodate both constant envelope and non-constant envelope modulation. In addition, in one embodiment, such a programmable transmitter may not require an offset modulation for the non-constant envelope case.

Figure 3:
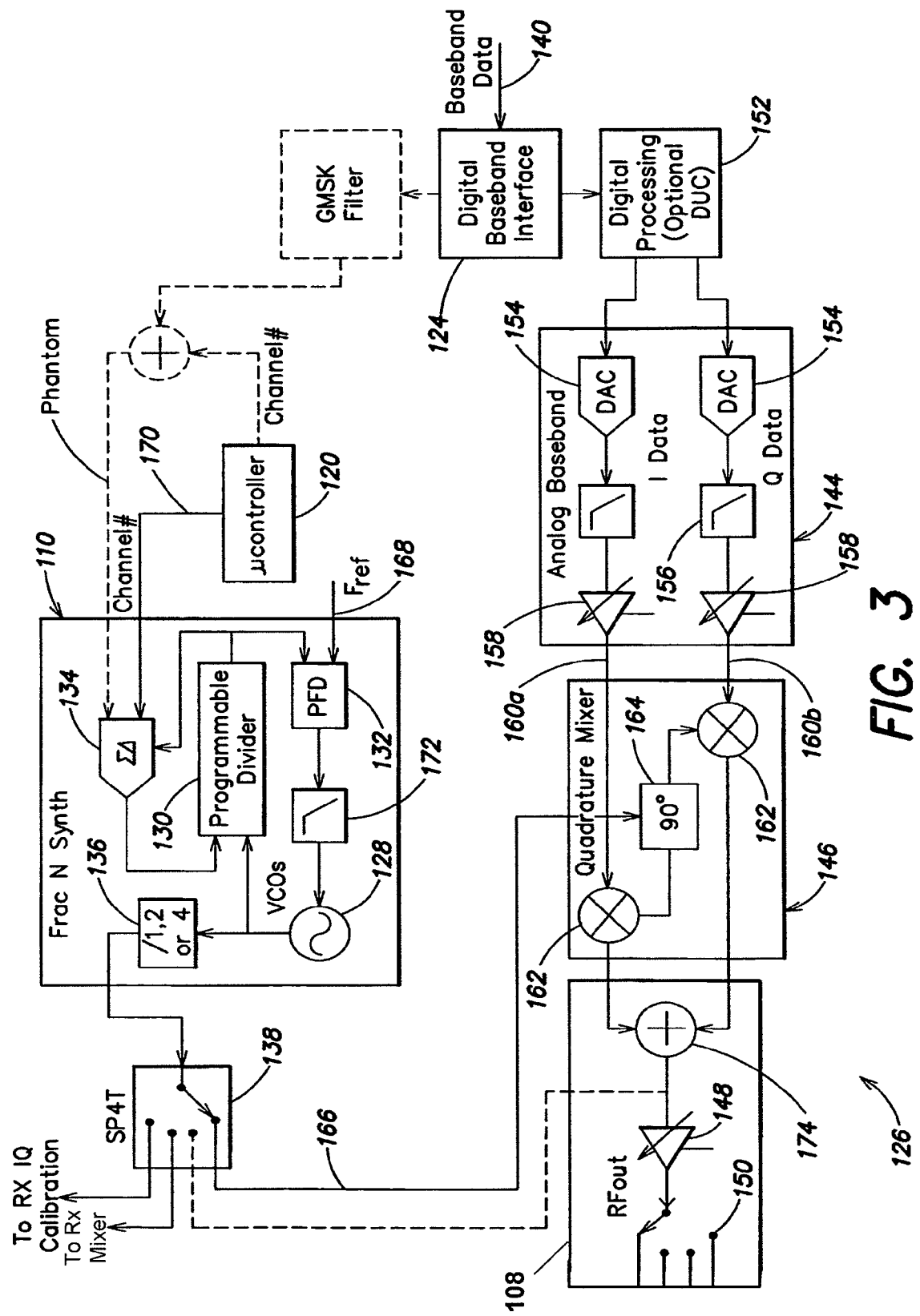
FIG. 3 is a block diagram of a transmitter architecture adapted to allow operation in a Direct Conversion Mode for constant envelope modulation, in accordance with one embodiment of the invention.

According to one embodiment, the transmitter may operate in a Direct Conversion Mode to accomplish non-constant envelope modulation. Referring to FIG. 3, there is illustrated the transmitter architecture of FIG. 1 with components not used in the Direct Conversion Mode shown in phantom. In this mode, the baseband digital data stream may enter the Digital Baseband Interface 124 on line 140 where it may be converted into in-phase (I) and quadrature (Q) modulated digital data. In some embodiments, the transmitter architecture 126 may comprise the digital processing block 152 that may include pulse shaping filters, digital up-samplers, signal encoders and an optional Digital Up-Conversion block. The digital processing block may process the I and Q modulated data before it is converted to analog data in the digital-to-analog converter block 144. In addition, in some embodiments, conversion of the baseband data into I and Q modulated digital data may occur in the digital processing block. The modulated digital data from the Baseband Interface may be transferred to the Digital-to-Analog converter block 144 either directly, or through the digital processing block 152.

In one example, the Digital-to Analog converter (DAC) block 144 may comprise digital to analog converters 154, reconstruction filters 156, and baseband amplifiers 158. In the DAC block 144, the digital data stream may be fed into variable speed I/Q digital-to-analog (DAC) converters 154 which, in conjunction with reconstruction filters 156 and baseband variable gain amplifiers (VGA) 158, may provide the analog I and Q data signals supplied to the Quadrature Mixer 146 via lines 160a and 160b, respectively. The Quadrature Mixer 146 may comprise mixer elements 162 and a 90-degree phase shifter 164. For up-conversion of the analog I and Q signals to radio frequency (RF) for transmission, the Quadrature Mixer 146 may receive a local oscillator (LO) signal with frequency $F_{LO}$ on line 166 from the frequency synthesizer 110. The LO signal may be mixed with the I and Q signals to provide RF signals which then may be amplified in the RF gain block 108 and transmitted.

According to one embodiment, the LO frequency $F_{LO}$ may be derived from a reference frequency ($F_{ref}$) that may be supplied to the frequency synthesizer 110 on line 168. The numerical value of $F_{LO}$ may be determined by the microcontroller 120. In one embodiment, the micro-controller 120 may also issue a programmable digital word that corresponds to a particular channel of a wireless standard (for example, CDMA). The digital word may be applied to the sigma-delta modulator 134 on line 170. Using the supplied reference frequency and channel selection signal, the frequency synthesizer may generate a suitable local oscillator carrier frequency. The programmable divider 130 may receive a signal from the sigma-delta modulator that includes the channel selection information provided to the sigma-delta modulator from the microcontroller. The output signal from the programmable divider is fed into the phase-locked feedback loop comprising the programmable divider, the phase detector 132 (which also receives the reference frequency signal), a loop filter 172 and the VCO 128. The programmable divider 130, in combination with the phase detector 132 and the loop filter 172 may consequently provide an analog voltage to the VCO (s) 128, whose output is further passed through the output divider 136, generating the desired frequency carrier $F_{LO}$. In one example, the divider 136 may be a fixed divider having, for example, a 1- 2- or 4-divide ratio. Although, in the interest of conciseness, the divider 136 may generally be referred to in this disclosure as a fixed divider, it is to be appreciated that the synthesizer does not require the use of a fixed divider, and a second programmable divider may be used instead.

With $F_{LO}$ so determined, it may be provided to the quadrature mixer 146 via switch 138 on line 166. The analog I/Q baseband signals may be mixed with the $F_{LO}$ signal in the quadrature mixer 146 to provide modulated I/Q signals which may be fed to the RF gain block 108 where they may be combined. In one embodiment, the modulated I and Q signals may be combined in a summer 174. However, it is to be appreciated that the summer 174 is not required, and the I and Q signals may alternatively be combined in a wire at the input to the R.F. variable gain amplifier 148. Also in the RF gain block, the variable gain amplifier 148 may amplify the combined signal from summer 174 to generate the modulated output RF signal that can be directed to the appropriate external bandpass filter or duplexer by an additional output/band-select switch 150.

Figure 4:
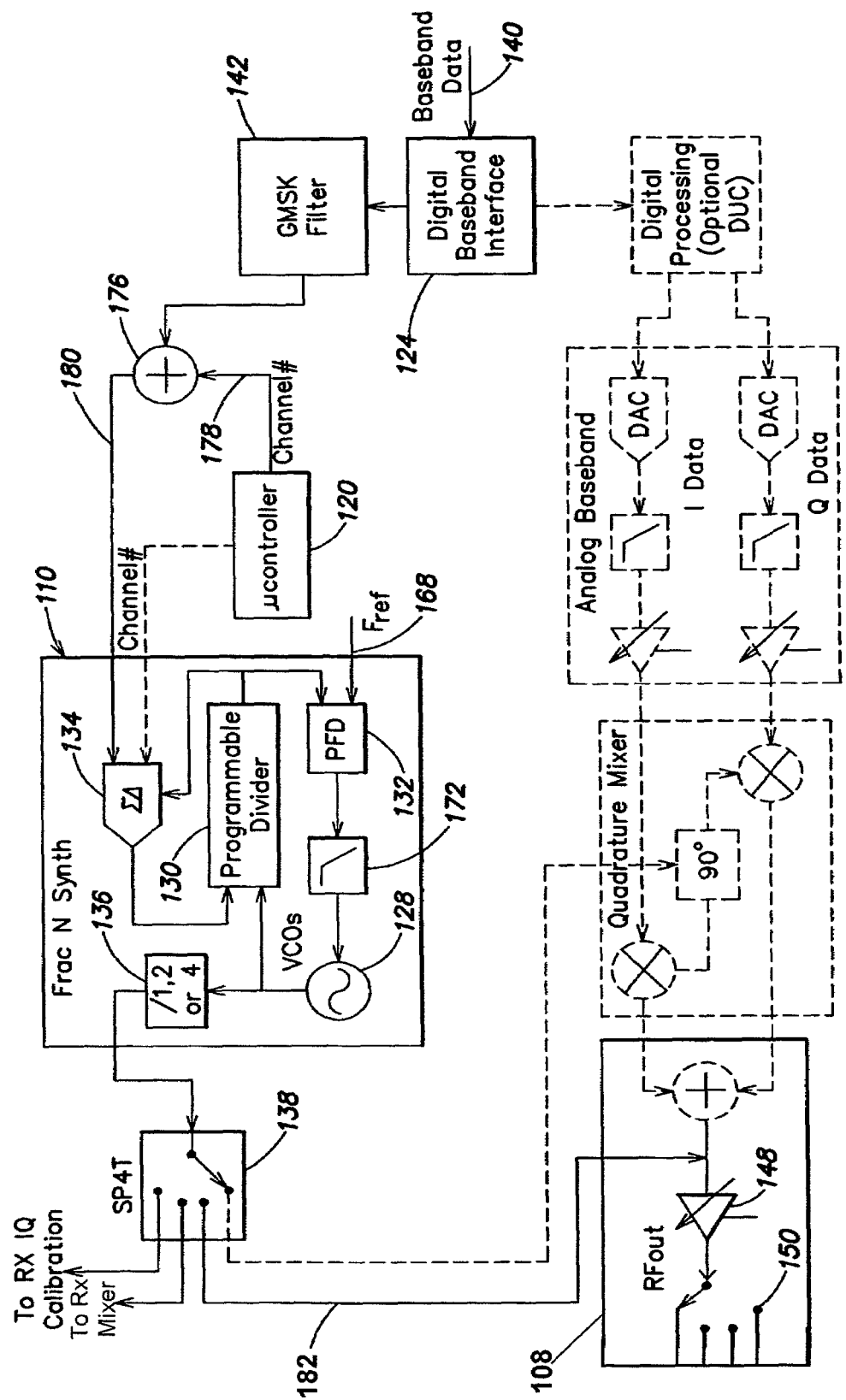
FIG. 4 is a block diagram of one embodiment of a transmitter architecture adapted to operate in a phase-locked loop mode, in accordance with another embodiment of the invention.

According to another embodiment, the transmitter architecture of FIG. 2 may operate in a Phase-Lock Loop (PLL) Mode to accommodate constant envelope modulation. This mode does not rely on the use of the Quadrature Mixer 146 and Analog Baseband 144 blocks and thus these blocks may be turned off, as discussed below. Referring to FIG. 4, there is illustrated an embodiment of the transmitter architecture (similar to that shown in FIG. 2) for PLL Mode, with the unused components illustrated in phantom. In this mode, the baseband data may again enter the digital baseband interface 124 on line 140. The baseband data stream may be filtered by the pulse-shaping filter 142 and converted into frequency deviations. The pulse-shapes filter 142 may be a Gaussian Minimum Shift Keying filter. In one embodiment, implementation of the Gaussian filter may be accomplished in a digital look-up table. These frequency deviations may be combined in a summer 176 with a digital word issued by the microcontroller 120. This digital word may be applied to the summer 176 on line 178 and may contain a selected channel of the particular wireless standard with which the transmitter is complying. In this manner, the microcontroller may at least partially control the frequency of the signal produced by the frequency synthesizer 110.

As shown in FIG. 4, the summed signal from summer 176 may be fed to the sigma-delta modulator 134 of the frequency synthesizer 110 on line 180. The modulated output of the sigma-delta modulator 134 may be fed into the programmable divider 130 whose output may be combined with a reference frequency ($F_{ref}$) in the phase detector 132 and may be low-passed filtered (by loop filter 172), before providing the control voltage input for the VCO 128. As discussed above, the microcontroller may control the value of the reference frequency. The modulated output signal from the VCO may be fed back via the programmable divider 130 into the phase detector 132, as shown in FIG. 4, to ensure frequency stability of the modulated signal. The VCO output may also applied to the fixed output divider 136 that can be set to a divide ratio of 1, or 2, or 4, depending on the desired operating frequency range.

In PLL Mode, the modulated transmission signal is generated by the frequency synthesizer without the need for the analog baseband block and quadrature mixer. Modulation may be controlled by the sigma-delta modulator which receives the digital data entering the transmitter on line 140, and by the control signals from the microcontroller 120. The carrier frequency, which is modulated with the digital data, may be generated by the frequency synthesizer. The modulated carrier frequency may then be applied to the RF gain block 108 on line 182 via switch 138. In the RF gain block, the signal may be amplified and supplied to an antenna (e.g., the programmable antenna illustrated in FIG. 1) via switch 150 for transmission.

According to another embodiment, the transmitter may be configured to operate in Two-Point Modulation mode for constant envelope modulation. This embodiment may include a two-point modulation circuit that uses a two-port VCO and that eliminates the summing of the two signal paths before they enter the VCO. In one example, there is provided a calibration technique that is based on measuring the signal inside the PLL feedback loop prior to the VCO and adjusting the gain of the second or direct path to the VCO until there is no voltage swing inside the PLL feedback loop. It is to be appreciated that although each of these embodiments may refer primarily to one VCO, the principles of the invention may be applied to circuit including multiple VCOs as well.

Figure 5:
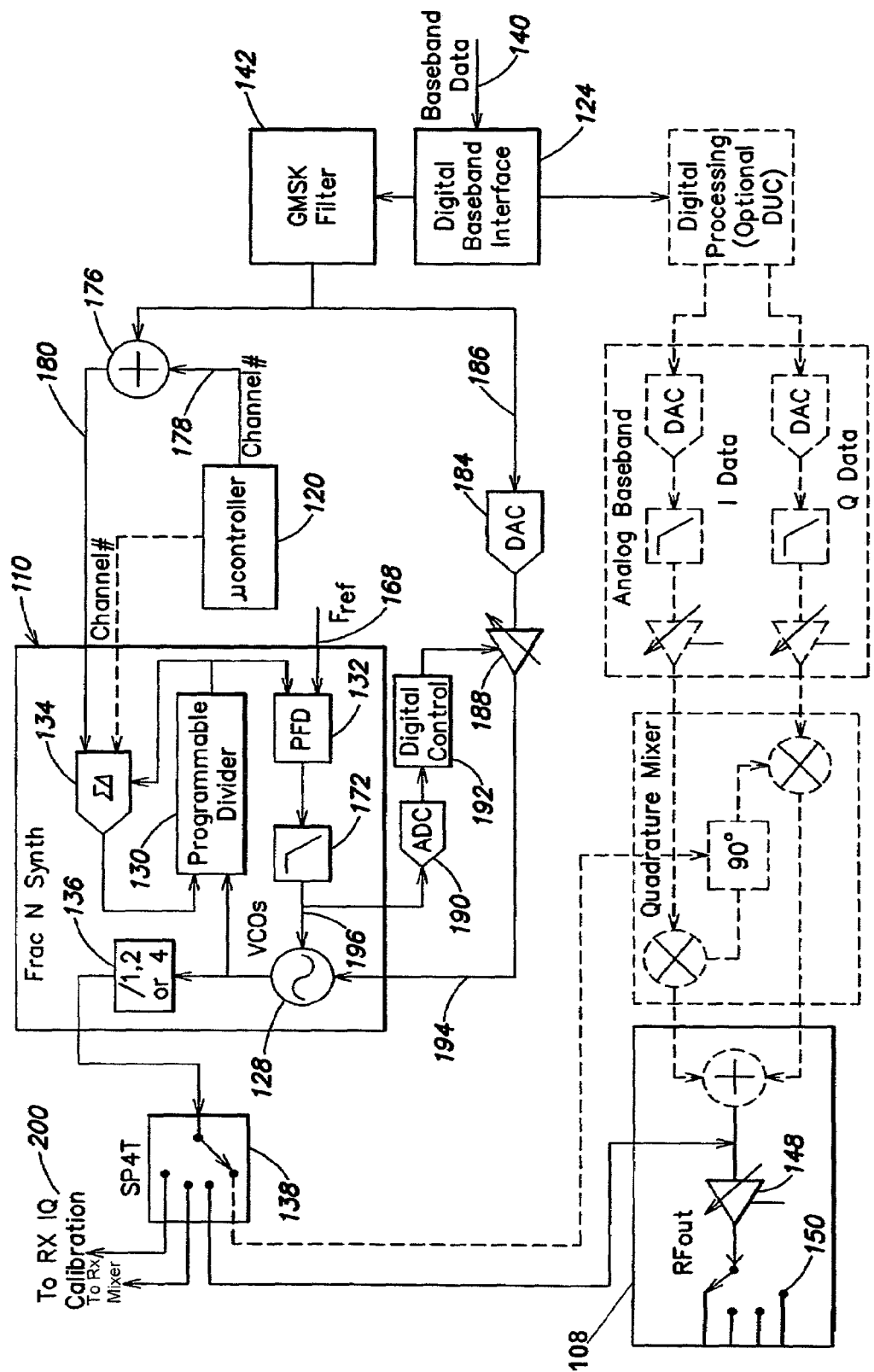
FIG. 5 is a block diagram of one embodiment of a transmitter architecture adapted to operate in a Two-Point Modulation (TPM) Mode, in accordance with aspects of the invention.

Referring to FIG. 5, there is illustrated a block diagram of a transmitter architecture adapted to operate in a Two-Point Modulation mode. Two-point modulation refers to a method in which the same data signal that is applied to the sigma-delta modulator online 180 (data path 1) may also be used to directly modulate the VCO by way of a second data path on line 186 (data path 2). Because the low pass frequency response of the loop filter may distort the modulated data, the second data path may be provided with a high pass filter response, such that superposition of data signals from both paths onto the output of the frequency synthesizer can then yield a flat signal response for data at the output port of the frequency synthesizer. In Two-Point Modulation mode, the Quadrature Mixer 146 and DAC converter block 144 (see FIG. 2) again may be turned off as these blocks may not be needed. These and other components not used in Two-Point Modulation mode are shown in phantom in FIG. 5. As in PLL mode, the data stream entering the Digital Baseband Interface 124 on line 140 may be converted into frequency deviation commands, filtered via the filter 142 and then combined in the summer 176 with a channel selection command issued by the micro-controller 120 on line 178. The combined data may then enter the Sigma-Delta Modulator 134 where the frequency deviation commands, along with the channel selection issued by the microcontroller, may be converted into input data for the programmable divider 130. The input data may then by processed through the feedback loop of the frequency synthesizer. Specifically, the input data may be fed to the phase converter 132, along with the reference frequency signal, then filtered by the loop filter 172 and provided as an input to the VCO 128. The VCO signal may then be fed back through the feedback loop to ensure frequency stability as discussed above.

At the same time, the data stream from the filter 142 may also be fed to a digital to analog converter 184 on line 186. The output of the digital to analog converter 184 may be fed via a variable gain amplifier 188 directly to a second input port of the VCO 128, as shown in FIG. 5. The variable gain of the amplifier 188 may be adjusted by monitoring the analog input signal of the first input port of the VCO through an analog to digital converter 190, whose output becomes the input of a digital controller 192. The digital controller may provide control information, including a desired gain setting of the variable gain amplifier to reduce or eliminate voltage swing inside the PLL feedback loop. As shown in FIG. 5, because the direct signal to the VCO on line 194 and the PLL signal on line 196 are applied to two ports of the VCO, the need for summing these signals before they enter the VCO is eliminated. Rather, in one example, calibration may be achieved by measuring the signal inside the loop, prior to the VCO, and adjusting the gain of the direct path until there is no voltage swing inside the loop. Thus, there is provided a monitoring and adjustment loop so that calibration using this loop may reduce or eliminate any voltage variation that may result from a frequency offset applied to one or both ports. The monitoring and adjustment loop may also allow re-calibration of the VCO 128 during switching between different communication standards. For example, if the microcontroller issues a new channel selection command on line 178 that may alter the desired frequency of the local oscillator signal to be generated by the frequency synthesizer, the Two-Point Modulation monitoring loop may correct for the frequency shift/offset now experienced on the PLL input to the VCO (line 196), thus recalibrating the VCO.

The output from the VCO 128 may be fed through the output divider 136 and switch 138 to an appropriate output. For transmission of the modulated RF data, the VCO output signal is fed via switch 138 to the RF gain block 108 where it may be amplified by the RF amplifier 148 and directed to the appropriate external bandpass filter or duplexer via the output/band-select switch 150.

Thus, various embodiments of the invention may provide a programmable transmitter architecture including a fractional N-synthesizer, a micro-controller, a quadrature mixer, an analog baseband system, an optional digital up-conversion unit, a digital baseband interface, and a programmable digital filter that enables both direct IQ modulation for non-constant envelope schemes and PLL-based modulation of a VCO for constant envelope schemes. In some embodiments, the transmitter architecture may further include a Two-Point Modulation calibration circuit as described above to allow for PLL-based, two point modulation for constant envelope schemes.

According to another embodiment, the frequency synthesizer 110 may be used for the generation of the local oscillator frequency and calibration signal in a receiver portion of a transceiver, such as transceiver 100 illustrated in FIG. 1, to which the transmitter architecture belongs. The RF signal generated by the VCO as part of the frequency synthesizer can also be routed, via switch 138 (see FIGS. 2-5) into the receiver architecture of the transceiver. In one example, the VCO can provide a local oscillator frequency for the down-converter mixer in the receiver by setting the switch 138 to output 198 labeled "To Rx Mixer." The option of switching the RF frequency signal either into the receiver or transmitter architectures may prove particularly useful in communication standards that require half-duplex mode of operation, for example, GSM. Beyond using the RF frequency signal from switch 138 in the down-converter mixer section of the receiver, it can also be used for calibration of the I/Q chain of the receiver by setting the switch 138 to direct the signal to output 200 labeled "to the Rx I/Q Calibration."

Figure 6:
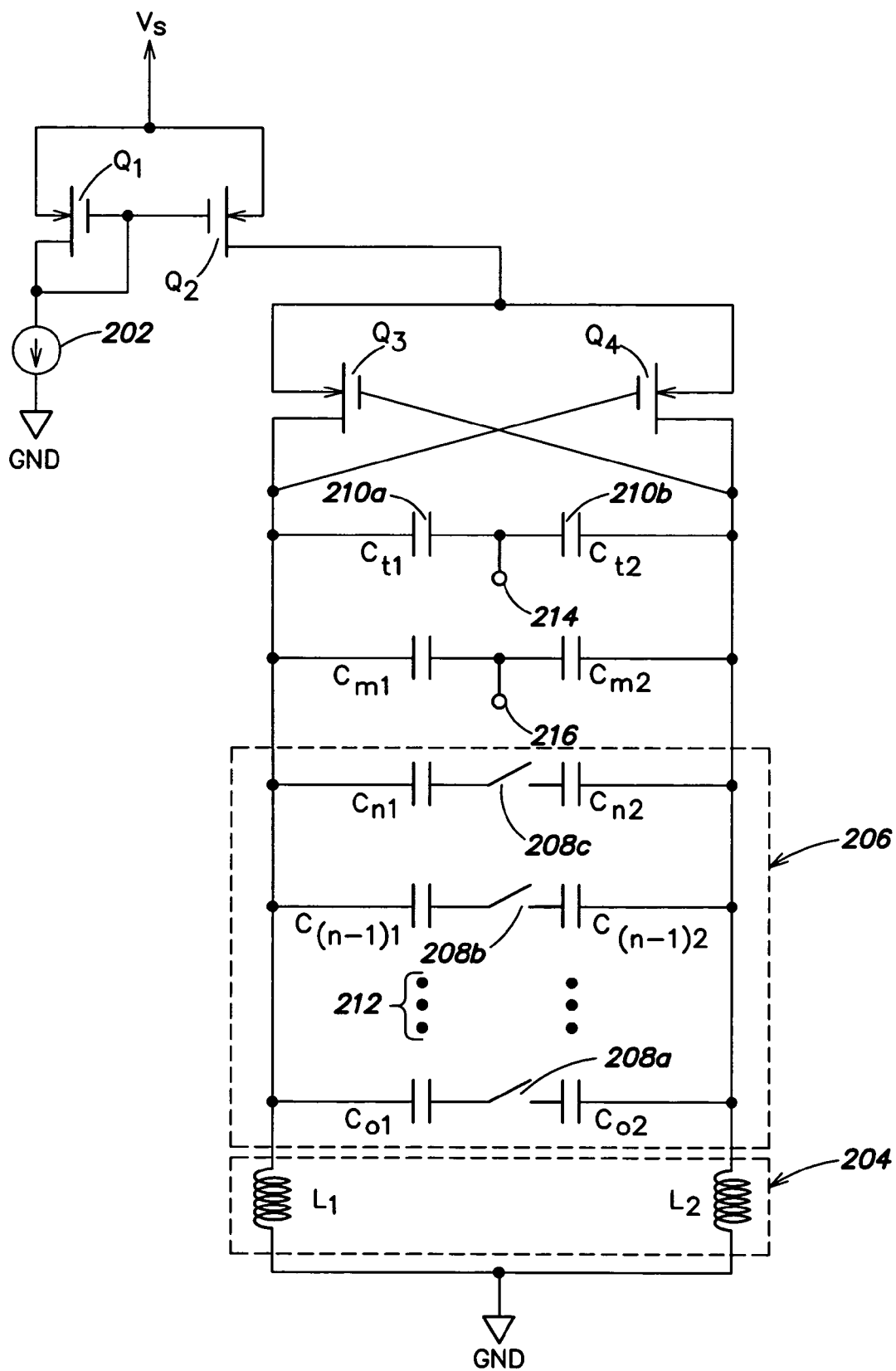
FIG. 6 is a diagram of one example of a voltage controlled oscillator implementation according to an embodiment of the invention.

Referring to FIG. 6, there is illustrated one example of a schematic circuit implementation for the VCO 128. According to one embodiment, the VCO circuit may use cross-coupled PMOS transistors Q1 and Q2 to generate a negative resistance, and use NMOS, source-follower tail transistors Q3 and Q4 to control bias currents. The degree of control may be accomplished by a current source 202. A power supply source voltage may be supplied at terminal $V_s$. The VCO 128 may furthermore employ a resonant tuning circuit comprising inductors 204 (e.g., including inductors L1 and L2) that may be augmented by a capacitor bank 206 as well as additional tuning capacitors as discussed below. In one example, the VCO resonant circuit may use fixed inductors formed by transmission lines in conjunction with fixed and variable capacitive elements. This architecture may provide an efficient implementation of a wideband tuning circuit for the VCO that may allow a tuning range of more than a gigahertz.

According to one embodiment, the inductors L1 and L2 may be implemented as bondwires that may be used to couple various circuit components to a semiconductor substrate. Each bondwire may have associated with it a certain inductance that may be dependent on the length of the bondwire, the cross-sectional area of the bondwire, and the spacing between adjacent bondwires (which affects mutual inductive coupling between the bondwires). At a given operating frequency, the inductance associated with the bondwires may be approximated by a fixed inductance, which is the inductance represented by L1 and L2 in FIG. 6. It is to be appreciated that each of L1 and L2 may be include one or more bondwires, and also that inductors 204 may include additional inductive elements as well. The use of bondwire inductors in a VCO resonant circuit may have several advantages, including, for example, providing better phase noise, lower power consumption, and wider tuning range than may conventional on-chip spiral inductors. Improved phase noise may be due to the higher quality factor (Q) of the bondwires with respect to on-chip inductors, such as spiral inductors, and extended tuning range may be due to the lower parasitic capacitance associated with bondwire inductors. In addition, conventional spiral inductors are relatively large, and using bondwires instead of such spiral inductors may allow for a smaller circuit footprint. However, it is to be appreciated that the invention does not require the use of bondwires for inductors 204, and other transmission line inductors or conventional inductors may also be used.

Referring again to FIG. 6, the VCO resonant circuit may include the bank of switchable capacitors 206 coupled to the inductors 204. The bank of capacitors 206 may include, for example, a plurality of MOS (metal oxide semiconductor) or MIM (metal-insulator-metal) capacitors that may be switched electronically by control signals applied to the switches 208a, 208b, 208c. It is to be appreciated that any type of capacitor may be used; however, MOS and MIM capacitors are common to CMOS and other semiconductor circuits and may therefore be preferred in some embodiments. To address the tradeoffs between better circuit performance and wider microelectronic process variations, the switchable bank of capacitors 206 may be used to increase the overall tuning range of the VCO, while reducing its tuning sensitivity to abate the effects of electromagnetic (EM) coupling and further improve phase noise. This may be done by dividing the overall tuning range into frequency bands. In one example, the capacitors 206 may have relatively large capacitance values (e.g., on the order of tens of picofarads each) and thus, a desired operating frequency band may be selected by switching in and/or out appropriate ones of the capacitors 206. Fine tuning within the selected frequency band may be achieved by controlling capacitance values of variable capacitors 210a and 210b. In one example, two accumulation mode MOS varactors $C_{t1}$ and $C_{t2}$ may be used for fine-tuning the frequency by applying a variable analog voltage ($v_{tune}$) through terminal 214. These varactors may be implemented, for example, as NMOS inside N-well varactors, although other designs may also be used. Thus, the switched capacitors 206 may serve as a means of coarse tuning, and the variable capacitors whose capacitance can be adjusted via a variable control voltage (e.g., varactor diodes), may be used for fine tuning. The challenge of frequency band selection can then be solved by using digital counters and successive approximation algorithms to quickly select the band that contains the desired channel frequency (note that the channel frequency may be specified by the microcontroller as discussed above).

In addition, a modulation analog voltage signal may be applied through terminal 216 that may affect modulation varactors Cm2 and Cm2 (which also may be implemented as in NMOS inside N-well) to apply modulation to the local oscillator carrier frequency being generated by the VCO. This modulation may be representative of the digital data that may be received by the transmitter on line 140 (see, for example, FIG. 1). Other embodiments of a VCO that may be used in the invention are disclosed in co-pending, commonly-owned U.S. patent application Ser. No. 11/202,626, entitled "PROGRAMMABLE RADIO TRANSCEIVER," filed Aug. 11, 2005, and which is herein incorporated by reference, and in co-pending, commonly-owned U.S. patent application entitled "CONTINUOUS GAIN COMPENSATION AND FAST BAND SELECTION IN A MULTISTANDARD, MULTIFREQUENCY SYNTHESIZER," filed on even date herewith, and herein incorporated by reference.

According to one embodiment, a six-bit switched metal on metal (MOM) capacitor array may be used for band selection. In this example, the capacitor bank 206 may include six pairs of capacitors $C_{01}$ and $C_{02}$ to $C_{n1}$ and $C_{n2}$, where (in this example) n=6. Of course it is to be appreciated that the invention is not limited to a six-bit case, and other values of n may be used, for example, a four-bit or eight-bit design. In addition, each bit is not limited to controlling a pair of capacitors, but may instead control one or several capacitors. A digital control word may be issued by the microcontroller 120 (see, for example, FIGS. 1 and 2), that may be applied to the switches 208a, 208b, and 208c to control whether the switches are open or closed. In one example, this control word may be a binary word that may include a bit to control each of the switches. For example, in the illustrated six-bit case, bit 0 may control switch 208a, bit 5 may control switch 208b and bit 6 may control switch 208c. The other intervening bits may control additional switches not shown in FIG. 6, but represented by dots 212. In one example, the control word may be supplied from the microcontroller to the switches via a digital programming bus, such as that illustrated in FIG. 1.

Table 1 below illustrates some examples of frequency band selection for three different VCOs that can be realized with a six bit binary pattern 0-63. It is to be appreciated that the frequency band values given for each VCO are exemplary only and not intended to be limiting. The actual band values for a given implementation may depend on the values of the capacitors 206, the inductance values provided by inductor 204, the reference frequency value (see, for example, FIG. 1) and other factors.

TABLE 1

| Bit Pattern | | | | | | Frequency | VCO 1 | | VCO 2 | | VCO 3 | |
|---|---|---|---|---|---|---|---|---|---|---|---|---|
| Bit5 | Bit4 | Bit3 | Bit2 | Bit1 | Bit0 | Band | Min. Freq. | Max. Freq. | Min. Freq. | Max. Freq. | Min. Freq. | Max. Freq. |
| 0 | 0 | 0 | 0 | 0 | 0 | 0 | 1848 | 1863 | 2280 | 2299 | 4267 | 4397 |
| 0 | 0 | 0 | 1 | 1 | 1 | 7 | 1792 | 1806 | 2211 | 2226 | 3716 | 3803 |
| 0 | 0 | 1 | 1 | 1 | 1 | 15 | 1734 | 1746 | 2139 | 2153 | 3286 | 3348 |
| 0 | 1 | 0 | 1 | 1 | 1 | 23 | 1680 | 1691 | 2074 | 2087 | 2976 | 3021 |
| 0 | 1 | 1 | 1 | 1 | 1 | 31 | 1632 | 1642 | 2015 | 2026 | 2741 | 2777 |
| 1 | 0 | 1 | 1 | 1 | 1 | 39 | 1588 | 1596 | 1960 | 1971 | 2553 | 2582 |
| 1 | 0 | 1 | 1 | 1 | 1 | 47 | 1547 | 1554 | 1910 | 1920 | 2400 | 2424 |
| 1 | 1 | 0 | 1 | 1 | 1 | 55 | 1508 | 1516 | 1863 | 1872 | 2271 | 2291 |
| 1 | 1 | 1 | 1 | 1 | 1 | 63 | 1473 | 1480 | 1820 | 1828 | 2161 | 2179 |

Figure 7:
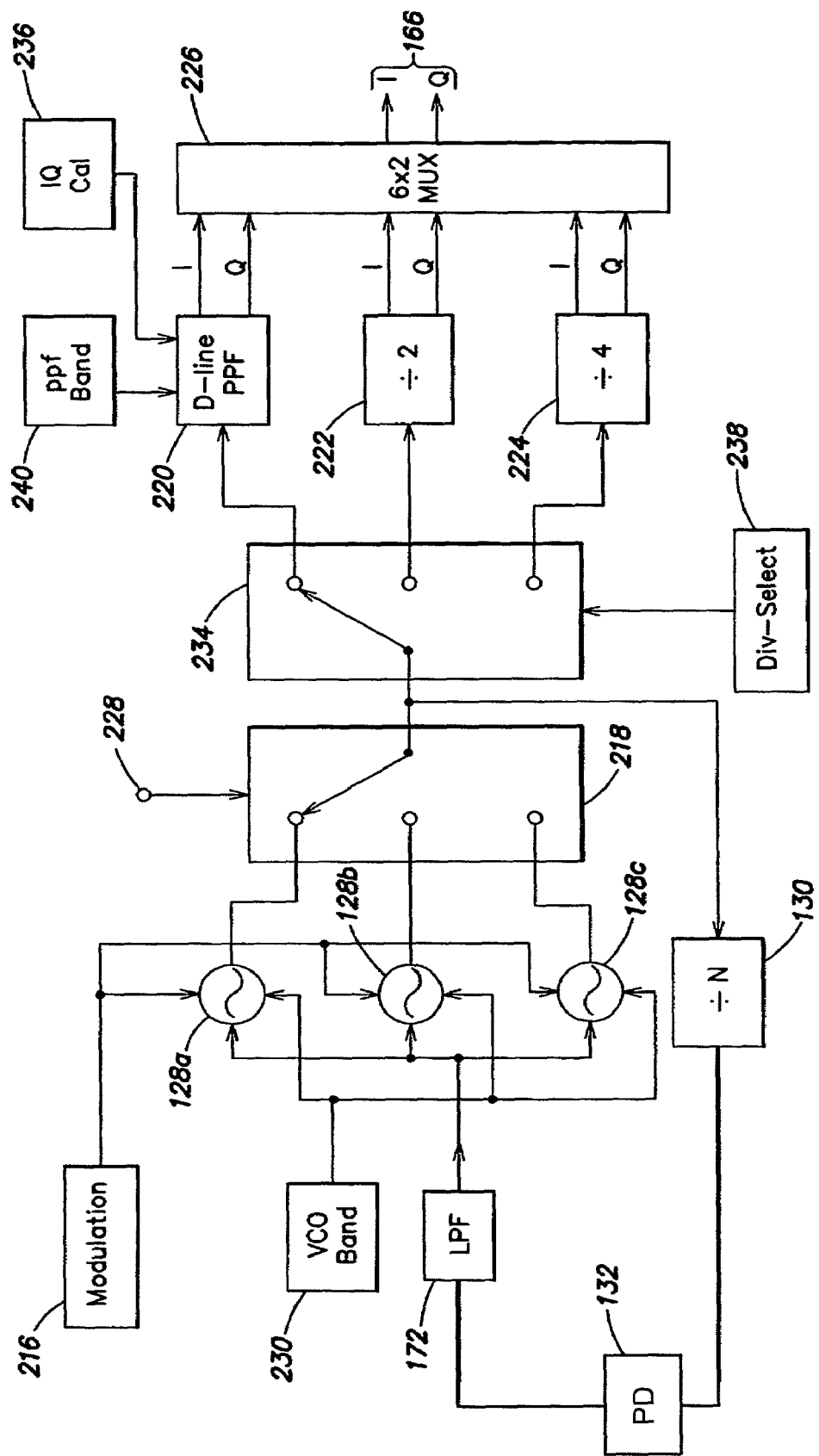
FIG. 7 is a block diagram of one example of a frequency synthesizer implementation according to another embodiment of the invention.

Referring to FIG. 7, there is illustrated one example of a circuit implementation of a local oscillator (or frequency synthesizer) according to an embodiment of the invention. In this embodiment, the local oscillator (LO) architecture may comprise three VCOs 128a, 128b, 128c, interfaced via two transmission-gate multiplexers 218 and 234. However, it is to be appreciated that the invention is not limited to the use of three VCOs, and more or fewer VCOs may be used. The LO circuit may further include three parallel blocks, namely a delay-line quadrature generator (or poly-phase filter (ppf)) 220, a divide-by-two frequency divider 222 and a divide-by-four frequency divider 224, that are coupled, via the multiplexers 218, 234 to the VCOs, as shown. Each of these three parallel blocks may receive a calibration signal from an IQ calibration circuit 236 that enables the signal to be split into its in-phase (I) and quadrature (Q) differential signal components. The I and Q differential signals from these three blocks may be fed into another multiplexer 226 the output of which is a single pair of differential signals in quadrature (i.e., an I signal and a Q signal) that may be fed via line 166 to the quadrature mixer(s) of the transmitter (see FIG. 2).

According to one embodiment, the first multiplexer 218 may select an output of one of the VCOs to couple to the second multiplexer 234, and also to be fed through the programmable divider 130, phase detector 132 and loop filter 172, back to the VCOs in a phase-locked loop configuration, as discussed above in reference to FIGS. 2-5. In one example, optional buffering (not shown) may be provided after the multiplexers 218, 234 and at the output of the divider circuits 222, 224. In one embodiment, VCO selection information (e.g., in the form of a digital control word) may be applied to the multiplexer 218 at terminal 228 to select one of the VCOs, and may also control the biasing of the VCOs. This means that only the VCO that is fed through the multiplexer 226 may be turned on at any given moment. By turning off the unused VCOs, power consumption in the circuit may be reduced. In addition, as discussed in reference to FIG. 6, a modulation signal may be applied to the VCOs from block 216 to allow digital data to be modulated onto the carrier frequency generated by the frequency synthesizer.

To facilitate the programming of a target frequency, a plurality of digital control words, supplied, for example, by the microcontroller, to operate the multiplexers 218, 234 and to select an appropriate frequency band in which the target frequency lies. In one example, a 2-bit VCO select word, applied to multiplexer 218 at terminal 228, may select which VCO is being used. A 6-bit VCO band signal 230 may be used to select the frequency band for the selected VCO, as shown, for example, in Table 1. In addition, a 2-bit division selection word may be used to select between one of the three parallel blocks, namely the polyphase filter 220, the divide-by-two block 222 or the divide-by-four block 224. For example, a bit sequence 00 may select divide by one (i.e., no divider is operated) and the signal may be fed from the multiplexer 234 to the polyphase filter 220. A bit sequence 01 may adjust the multiplexer to feed its output to the divide-by-two block 222, and a 11 bit sequence may control the multiplexer 234 to fed its output to the divide-by-four block 224. It is of course to be appreciated that bit sequences given are examples only and are not intended to be limiting. In addition, the control words may have more or fewer bits than do the examples given herein, particularly if more or fewer VCOs are used, or if the VCOs have more or fewer than 63 frequency bands.

According to one example, a fourth control word (which may include, for example, 3 bits), namely a ppf-band select word 240 may be used to select a frequency band for the polyphase filter 220. The polyphase filter 220 may be tuned to provide up to a 90 degree phase shift between its two outputs. For a given frequency, the amount of phase delay that the polyphase filter may provide between its outputs may vary. If the frequency synthesizer is being used in a multi-band transmitter, the frequency range that the polyphase filter may need to cover may be substantial. Therefore, the phase delay it supplies may be split into, for example, eight bands (although it is to be appreciated that more or fewer bands may be used, and that thus a band select word having more or fewer bits may be used) that are controlled digitally by the ppf-band select word 240.

Referring to Table 2 below, there is given some examples of different communication standards, and their corresponding frequency bands, that may be complied with using embodiments of the frequency synthesizer described herein. For example, to implement the CDMA2k standard listed in row 1 of Table 2 below, VCO-1 (see Table 1) may be selected, the 6-bit VCO band signal 230 may be set to 63 (i.e., binary 111111), and the divide-by-two block 222 may be used to yield 736 MHz (the lower end of the range). To achieve the higher end of the range, namely 1140 MHz, VCO-2 may be selected with the bit pattern of the 6-bit VCO band signal 230 set to 0 (i.e., binary 000000) and a further division factor of 2 supplied by the divide-by-2 block 222. Small deviations from the target frequencies of 735 MHz and 1150 MHZ may be compensated for by fine tuning the VCOs, as discussed above. As another example, to implement the GSM (1470 MHz-2300 MHz) standard shown in row 4 of table 2, VCO-1 may be used with the 6-bit VCO band signal 230 set to 63 (i.e., binary 111111) to yield 1473 MHz, and VCO-2 may be used with a bit pattern 0 (i.e., binary 000000) to yield 2280 MHz. In this case, neither divide circuit (222 or 224) may be needed. Again, fine tuning to achieve the exact target frequencies may be accomplished by fine tuning the VCOs. It is to be appreciated that the above examples are not to be considered limiting and that many combinations of different VCOs with different bit patterns for the 6-bit VCO band signal 230 may be used to achieve different tuning bands. In addition, the dividers 222 and 224 may add further flexibility. Of course it is also to be appreciated that the given simulated frequency ranges (of the frequency synthesizer) are examples only and are not intended to be limiting. Exact values of the simulated frequency ranges may depend on many factors, including, for example, capacitor and inductor values, the reference frequencies used, etc.

TABLE 2

| Standard | Required Frequency Range | Simulated Frequency Range |
|---|---|---|
| CDMA2k (f < 1 GHz) | 747-960 MHz | 735-1150 MHz |
| CDMA2k (f > 1 GHz) | 1840-2170 MHz | 1470-2300 MHz |
| GSM (f < 1 GHz) | 747-960 MHz | 735-1150 MHz |
| GSM (f > 1 GHz) | 1805-1990 MHz | 1470-2300 MHz |
| UMTS (f < 1 GHz) | 869-894 MHz | 735-1150 MHz |
| UMTS (f > 1 GHz) | 1805-2170 MHz | 1470-2300 MHz |
| WiFi | 2400-2484 MHz | 2160-4400 MHz |
| WiMax (f < 3 GHz) | 2150-2690 MHz | 1820-4400 MHz |
| WiMax (f > 3 GHz) | 3650-3700 MHz 3410-4200 MHz (O) | 2160-4400 MHz |

Through the use of multiple control words/signals that may select between different components and control operating frequency ranges of many components, a wideband, highly flexible frequency synthesizer may be provided. In addition, as discussed above, a microcontroller supply control signals (e.g., via a digital programming bus), to turn on various components that may not be needed in a given mode and for a given operating frequency band and communication standard, thereby reducing component count and conserving power. In this manner, a power-efficient multi-band, multi-standard transmitter may be provided.

It is to be appreciated that embodiments of the frequency synthesizer and transmitter architectures described herein may be capable of providing local oscillator carrier frequencies within any one of numerous desired frequency bands, and may thus allow compliance with many different communication standards. In particular, the circuit illustrated in FIG. 7 may be very flexible in that it may allow switching between different VCOs, course tuning (e.g., switching between frequency bands) within each VCO selection (as described in reference to FIG. 6) as well as fine tuning within each selected frequency band. In addition, the output dividers 222 and 224, and the polyphase filter 220, may allow additional frequency options, further enhancing the capability of the architecture. As described above, the transmitter architecture may also accommodate both constant and non-constant envelope modulation to comply with different communication standards. Digital control, in particular, digital switching on and off, of components and reuse of component blocks for different operating modes and frequencies may provide a compact and power-efficient transmitter that may be easily fabricated and yet offers great versatility.

Having thus described several aspects and embodiments of the invention, modifications and/or improvements may be apparent to those skilled in the art and are intended to be part of this disclosure. It is to be appreciated that the invention is not limited to the specific examples described herein and that the principles of the invention may be applied to a wide variety applications. The above description is therefore by way of example only, and includes any modifications and improvements that may be apparent to one of skill in the art. The scope of the invention should be determined from proper construction of the appended claims and their equivalents.

What is claimed is:

1. A programmable transmitter comprising:
   a programmable frequency synthesizer adapted to generate a local oscillator carrier frequency;
   a plurality of transmitter components;
   a microcontroller coupled to the frequency synthesizer and to the plurality of transmitter components;
   a digital baseband interface adapted to receive digital data to be transmitted; and
   a pulse-shaping filter coupled between the frequency synthesizer and the digital baseband interface;
   wherein the plurality of transmitter components includes:
      a digital-to-analog converter coupled to the digital baseband interface and adapted to receive the digital data and to convert the digital data into I and Q analog data signals; and
      a quadrature mixer coupled to the digital-to-analog converter and adapted to receive the I and Q analog data signals from the digital-to-analog converter, and also coupled to the frequency synthesizer and configured to receive the local oscillator carrier frequency from the frequency synthesizer, the quadrature mixer being configured to combine the local oscillator carrier frequency and the I and Q analog data signals to provide a radio frequency data signal from transmission;
   wherein the microcontroller is configured to provide a frequency control signal to the frequency synthesizer to control a frequency of the local oscillator carrier frequency,
   wherein the microcontroller is further configured to provide digital control signals to at least some of the plurality of transmitter components to turn on and off different ones of the plurality of transmitter components based on an operating mode of the transmitter, such that the transmitter can accommodate both constant envelope modulation and non-constant envelope modulation schemes; and
   wherein the microcontroller is configured to provide the digital control signals to the pulse-shaping filter to turn off the pulse-shaping filter.

2. The programmable transmitter as claimed in claim 1, wherein the programmable transmitter is configured to implement direct IQ modulation for the non-constant envelope modulation scheme.

3. The programmable transmitter as claimed in claim 1, wherein the frequency synthesizer comprises a phase-locked loop including a fractional-N divider and a voltage controlled oscillator; and wherein the frequency synthesizer is configured to receive the digital data from the digital baseband interface via the pulse-shaping filter.

4. The programmable transmitter as claimed in claim 3, wherein the frequency synthesizer is configured to implement phase-locked loop modulation for the constant-envelope modulation scheme.

5. The programmable transmitter as claimed in claim 4, wherein the microcontroller is configured to provide the digital control signals to turn off the digital-to-analog converter and the quadrature mixer when the programmable transmitter is configured to implement the constant envelope modulation scheme.

6. The programmable transmitter as claimed in claim 3, further comprising a voltage controlled oscillator monitoring loop adapted to monitor a voltage response of the voltage controlled oscillator, the voltage controlled oscillator monitoring loop includes a variable gain amplifier, an analog-to-digital converter, and a digital controller; wherein:
   a first input port of the voltage controlled oscillator is coupled to the analog-to-digital converter which receives a voltage signal from the phase-locked loop and provides an output digital monitoring signal;
   a second digital-to-analog converter is coupled between an input of the variable gain amplifier and an output of the pulse-shaping filter, the second digital-to-analog converted being adapted to receive the digital data from the pulse-shaping filter and to provide an analog input signal to the variable gain amplifier;
   the digital controller is configured to receive the output digital monitoring signal from the analog-to-digital converter and to provide a gain control signal to the variable gain amplifier;
   an output signal of the variable gain amplifier is provided to a second input port of the voltage controlled oscillator; and
   the digital controller is configured to adjust the gain control signal so as to reduce variations in voltage between the output signal from the variable gain amplifier and the voltage signal from the phase-locked loop provided to the first input port of the voltage controlled oscillator.

7. The programmable transmitter as claimed in claim 1, wherein the frequency synthesizer comprises a voltage controlled oscillator connected in a phase-locked feedback loop with a fractional-N programmable divider.

8. The programmable transmitter as claimed in claim 7, wherein the voltage controlled oscillator comprises a resonant circuit including an inductive element connected in parallel with a switchable capacitor bank and at least one variable capacitance.

9. The programmable transmitter as claimed in claim 8, wherein the switchable capacitor bank comprises a plurality of fixed-value capacitors coupled together via a plurality of switches; wherein the plurality of switches are activated by the microcontroller to switch in and out selected ones of the plurality of fixed-value capacitors so as to select an operating frequency band for the frequency synthesizer.

10. The programmable transmitter as claimed in claim 9, wherein the microcontroller is further configured to control a capacitance value of the variable capacitor so as to fine tune a frequency of the local oscillator carrier frequency within the selected operating frequency band.

11. The programmable transmitter as claimed in claim 8, wherein the inductive element includes at least one bondwire.

12. The programmable transmitter as claimed in claim 1, wherein the microcontroller is adapted to provide digital control signals to at least some of the plurality of transmitter components to switch between VCO modulation of the local oscillator carrier frequency for constant envelope modulation schemes and I/Q modulation of the local oscillator carrier frequency for non-constant envelope modulation schemes.

13. The programmable transmitter as claimed in claim 12, wherein when the programmable transmitter is configured to implement the I/Q modulation, digital baseband data is provided to the quadrature mixer via the digital to analog converter block.

14. The programmable transmitter as claimed in claim 12, wherein when the programmable transmitter is configured to implement the VCO modulation, digital baseband data is provided to the frequency synthesizer with the quadrature mixer turned off.

15. The programmable transmitter as claimed in claim 1, wherein the microcontroller is configured to provide the digital control signals to the pulse-shaping filter to turn off the pulse-shaping filter when the programmable transmitter is configured to implement the non-constant envelope modulation scheme.

16. A frequency synthesizer comprising:
a plurality of voltage controlled oscillators;
a filter having an input coupled to a first terminal of a switch and an output coupled to a multiplexer;
a first divider having an input coupled to the first terminal of the switch and an output coupled to the multiplexer; and
a second divider having an input coupled to the first terminal of the switch and an output coupled to the multiplexer;
wherein the switch is operable to select an output of one of the plurality of voltage controlled oscillators and to couple the selected voltage controlled oscillator output to the first terminal of the switch; and
wherein the multiplexer is configured to provide a local oscillator carrier signal provided by the selected voltage controlled oscillator output.

17. The frequency synthesizer as claimed in claim 16, further comprising a programmable fractional-N divider coupled in a feedback loop between the first terminal of the switch and an input port of each of the plurality of voltage controlled oscillators.

18. The frequency synthesizer as claimed in claim 16, wherein the plurality of voltage controlled oscillators are configured to be turned off when uncoupled from the first terminal of the switch.

19. The frequency synthesizer as claimed in claim 16, further comprising a transmission gate multiplexer coupled between the first terminal of the switch and the filter, the first divider and the second divider;
wherein the transmission gate multiplexer is operable to select one of the filter, the first divider and the second divider and to couple the selected one of the filter, the first divider and the second divider to the first terminal of the switch.

* * * * *